United States Patent
Shimamura et al.

(10) Patent No.: US 10,386,852 B2
(45) Date of Patent: Aug. 20, 2019

(54) CONTROL APPARATUS FOR UTILITY VEHICLE

(71) Applicant: Honda Motor Co., Ltd., Tokyo (JP)

(72) Inventors: Hideaki Shimamura, Wako (JP); Yuki Matsui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 15/473,443

(22) Filed: Mar. 29, 2017

(65) Prior Publication Data
US 2017/0285652 A1    Oct. 5, 2017

(30) Foreign Application Priority Data

Mar. 31, 2016    (JP) .................................. 2016-071944

(51) Int. Cl.
*G05D 1/00*    (2006.01)
*G05D 1/02*    (2006.01)
(Continued)

(52) U.S. Cl.
CPC .......... *G05D 1/0265* (2013.01); *A01D 34/008* (2013.01); *B60K 1/02* (2013.01); *B60K 7/0007* (2013.01); *B60L 15/2036* (2013.01); *B60L 50/50* (2019.02); *G01C 21/08* (2013.01); *G05D 1/0214* (2013.01); *A01D 34/63* (2013.01); *A01D 34/78* (2013.01); *A01D 69/02* (2013.01); *A01D 2101/00* (2013.01); *B60K 2001/0416* (2013.01); *B60L 53/16* (2019.02); *B60L 2200/40* (2013.01); *B60L 2210/30* (2013.01);
(Continued)

(58) Field of Classification Search
CPC ... G05D 1/0265; G05D 1/0225; A01D 34/008
See application file for complete search history.

(56) References Cited

U.S. PATENT DOCUMENTS

2003/0025472 A1    2/2003 Jones et al.
2005/0156562 A1    7/2005 Cohen et al.
(Continued)

FOREIGN PATENT DOCUMENTS

EP    2806325 A2    11/2014
EP    2703925 A1    12/2015
(Continued)

*Primary Examiner* — Anne M Antonucci
*Assistant Examiner* — Renee LaRose
(74) *Attorney, Agent, or Firm* — Duft & Bornsen, PC

(57) ABSTRACT

In an apparatus for controlling operation of a utility vehicle that detects a magnetic field generated by electric current flowing through a boundary wire of a working area and is driven to run within the working area based on the detected magnetic field, having left and right magnetic sensor installed at lateral right and left positions of the vehicle to produce outputs proportional to strength of the magnetic field, turning mode is switched between gentle turning mode to make the vehicle turn while running near the boundary wire and sharp turning mode to make the vehicle pause near the boundary wire and then turn, when it is determined from the outputs of the magnetic sensors that the vehicle approaches the boundary wire, each time predetermined conditions are satisfied, and operation of the prime mover is controlled such that the vehicle turns in accordance with the switched turning mode.

14 Claims, 11 Drawing Sheets

(51) Int. Cl.

| | | |
|---|---|---|
| *A01D 34/00* | (2006.01) | |
| *B60K 1/02* | (2006.01) | |
| *B60K 7/00* | (2006.01) | |
| *G01C 21/08* | (2006.01) | |
| *B60L 15/20* | (2006.01) | |
| *B60L 50/50* | (2019.01) | |
| *A01D 34/63* | (2006.01) | |
| *A01D 34/78* | (2006.01) | |
| *A01D 69/02* | (2006.01) | |
| *A01D 101/00* | (2006.01) | |
| *B60K 1/04* | (2019.01) | |
| *B60R 16/02* | (2006.01) | |
| *B60R 21/0136* | (2006.01) | |
| *B60R 21/01* | (2006.01) | |
| *B60L 53/16* | (2019.01) | |

(52) U.S. Cl.
CPC ....... *B60L 2260/32* (2013.01); *B60R 16/0207* (2013.01); *B60R 21/0136* (2013.01); *B60R 2021/01013* (2013.01); *G05D 2201/0208* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | |
|---|---|---|
| 2013/0211648 A1 | 8/2013 | Yamamura et al. |
| 2016/0282867 A1 * | 9/2016 | Yamamura ........... A01D 34/008 |

FOREIGN PATENT DOCUMENTS

| | | |
|---|---|---|
| JP | 09282776 A | 10/1997 |
| JP | 11212642 A | 8/1999 |
| JP | 2002025235 A | 1/2002 |
| JP | 3493766 B2 | 2/2004 |
| JP | 2007149115 A | 6/2007 |
| JP | 2012064240 A | 3/2012 |
| JP | 2013164743 A | 8/2013 |
| JP | 2015165775 A | 9/2015 |
| WO | 2015072897 A1 | 5/2015 |

* cited by examiner

CONTROL APPARATUS FOR UTILITY VEHICLE

CROSS-REFERENCE TO RELATED APPLICATIONS

This application is based upon and claims the benefit of priority from Japanese Patent Application No. 2016-071944 filed on Mar. 31, 2016, the contents of which are incorporated herein by reference.

BACKGROUND OF THE INVENTION

Field of the Invention

This invention relates to a control apparatus for a utility vehicle, particularly to a control apparatus for a utility vehicle that is powered by a prime mover and services a working area under running while turning in the vicinity of the working area.

Description of Related Art

A prior art control apparatus for a utility vehicle of this type can be found, for example, in European Patent Application Publication No. 2806325. The control apparatus according to the technology described in the reference is configured so that when the utility vehicle turns in the vicinity of the working area, it turns smoothly without stopping in order to resolve the problem of time being wasted by pausing.

Although work efficiency can be enhanced by turning the utility vehicle in the vicinity of the working area at a gentle angle without pausing in the manner described in the reference, turning at a sharp angle is sometimes necessary to avoid leaving an unserviced region in the vicinity of the working area. However, the reference does not teach two such types of turning.

SUMMARY OF THE INVENTION

Therefore, an object of this invention is to overcome the aforesaid problem by providing a control apparatus for a utility vehicle adapted to turn a utility vehicle in the vicinity of a working area at either a sharp angle or a gentle angle.

In order to achieve the object, this invention provides an apparatus and method for controlling operation of a utility vehicle that detects a magnetic field generated during flow of electric current through a boundary wire laid around a working area and is driven to run within the working area based on the detected magnetic field, there is provided with left and right magnetic sensor installed at lateral right and left positions of the utility vehicle to produce outputs proportional to strength of the magnetic field. Turning mode is switched between a first turning mode to make the vehicle turn while running near the boundary wire and a second turning mode to make the vehicle pause near the boundary wire and then turn, when it is determined from the outputs of the magnetic sensors that the vehicle approaches the boundary wire, each time predetermined conditions are satisfied, and operation of the prime mover is controlled such that the vehicle turns in accordance with the switched turning modes.

BRIEF DESCRIPTION OF THE DRAWINGS

The above and other objects and advantages will be more apparent from the following description and drawings, in which.

DETAILED DESCRIPTION OF THE INVENTION

A control apparatus for a utility vehicle according to an embodiment of this invention is explained with reference to the attached drawings in the following.

Figure 1:
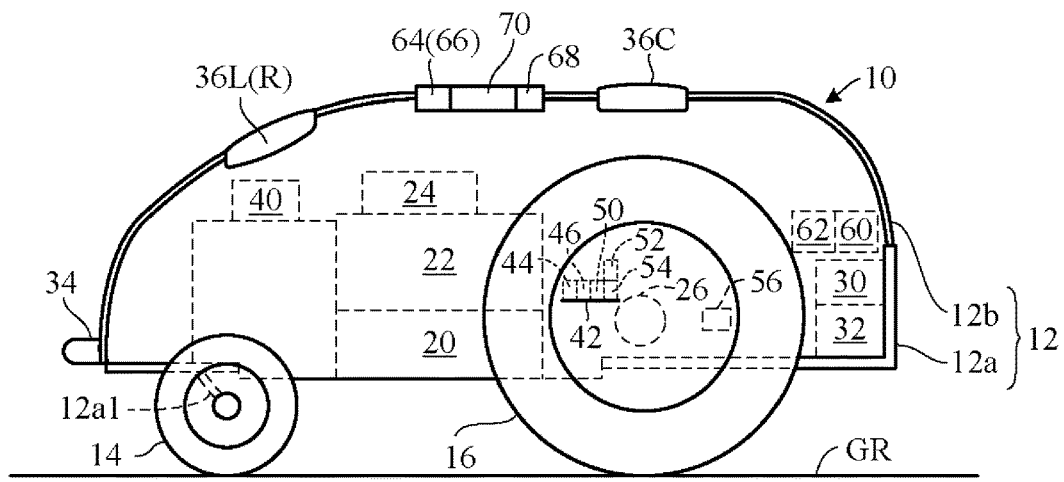
FIG. 1 is an overall schematic diagram showing a control apparatus for a utility vehicle according to an embodiment of this invention.
Figure 2:
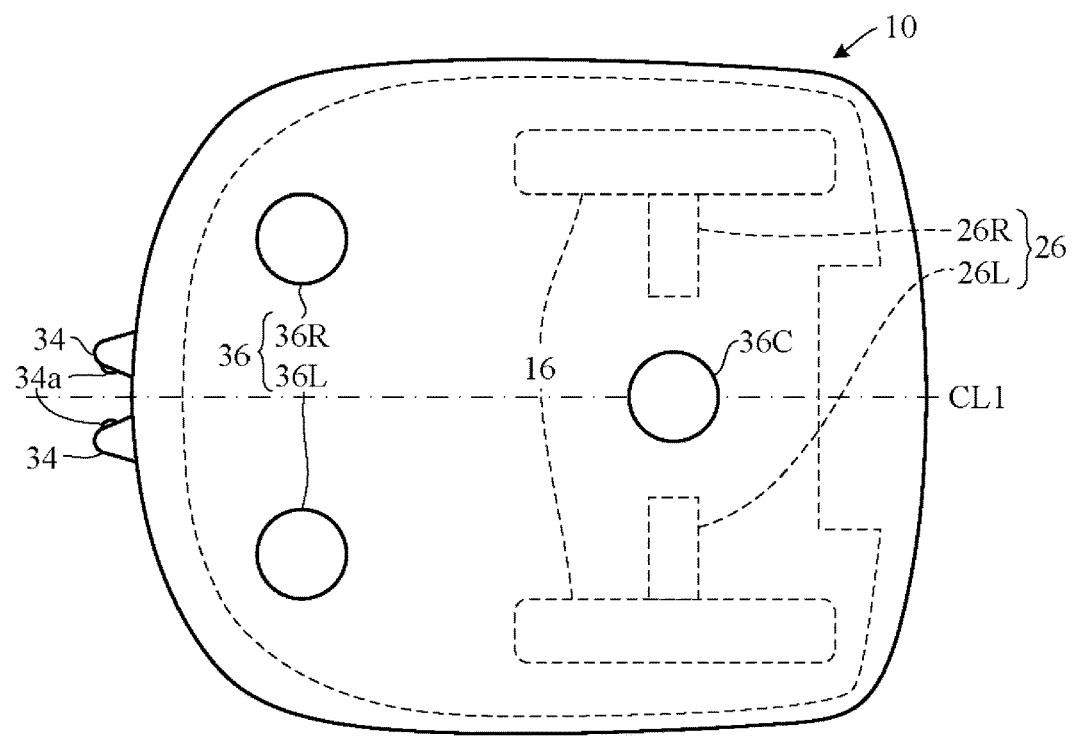
FIG. 2 is a plan view of the utility vehicle illustrated in FIG. 1.
Figure 3:
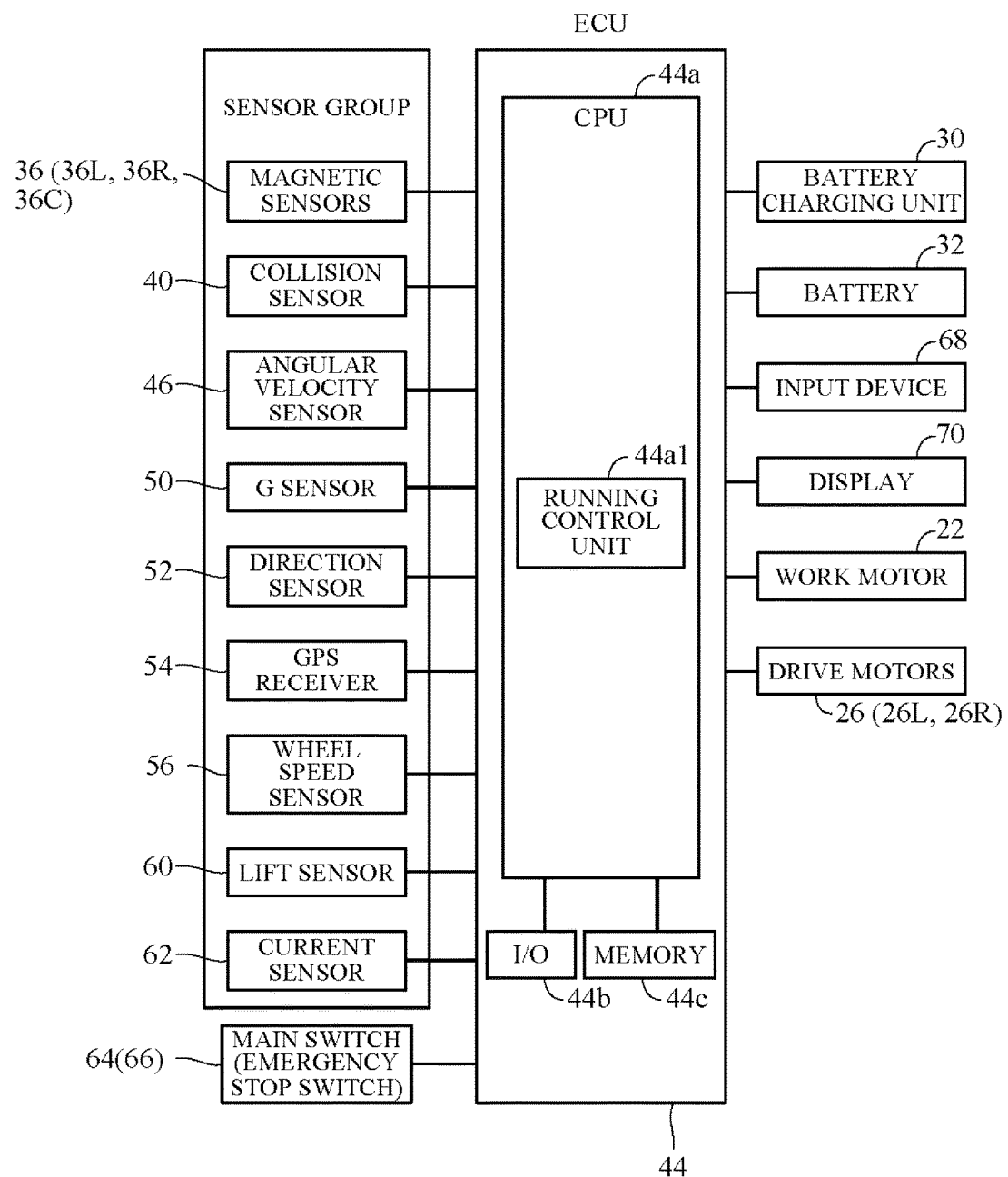
FIG. 3 is a block diagram showing inputs to an Electronic Control Unit installed in the utility vehicle illustrated in FIG. 1.

FIG. 1 is an overall schematic diagram showing a control apparatus for a utility vehicle according to an embodiment of this invention, FIG. 2 is a plan view schematically illustrating the configuration of the utility vehicle illustrated in FIG. 1; and FIG. 3 is a block diagram showing the configuration of the control apparatus of the utility vehicle according to the present embodiment including an Electronic Control Unit.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the operator. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a center line CL running in the straight forward direction along the widthwise center of the vehicle 10. In addition, a third magnetic sensor 36C is installed on the center line CL1 at a location remote from the sensors 36L and 36R. The magnetic sensors 36 produces an output indicating magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotates one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
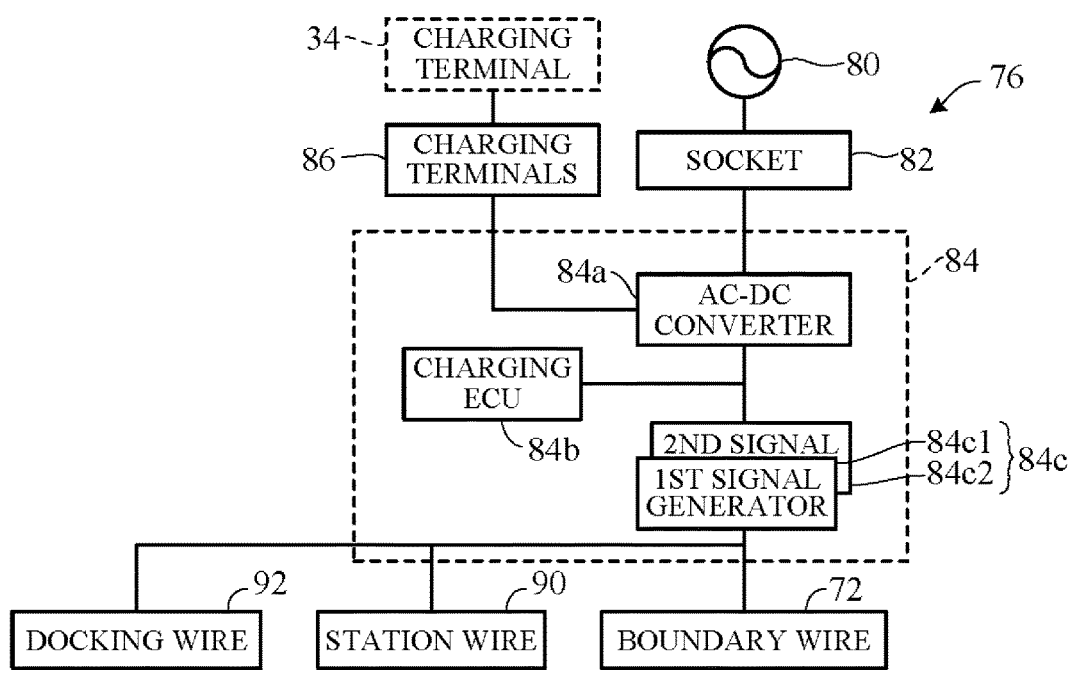
FIG. 5 is a block diagram showing configuration of a charging station of the utility vehicle shown in FIG. 4.

FIG. 5 is a block diagram showing electrical configuration of the charging station 76;

As shown in FIG. 5, the charging station 76 is equipped with a charger 84 connected through a socket 82 to a commercial power supply 80, and a pair of charging terminals 86 connected to the charger 84 and connectable to contact contacts 34a (shown in FIG. 2) of the pair of charging terminals 34 of the vehicle 10.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted into direct current and is stepped down to a suitable voltage by the AC-DC converter 84a of the charger 84 and sent to the charging terminals 86 to charge the onboard battery 32 through the charging contacts 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-Dc converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signal in continuance sequence of pulse train and supply the generated area signal to the boundary wire 72, a station wire 90 for delineating the charging station 76a and a docking wire 92 for guiding the vehicle 10 to a charging position.

Figure 6:
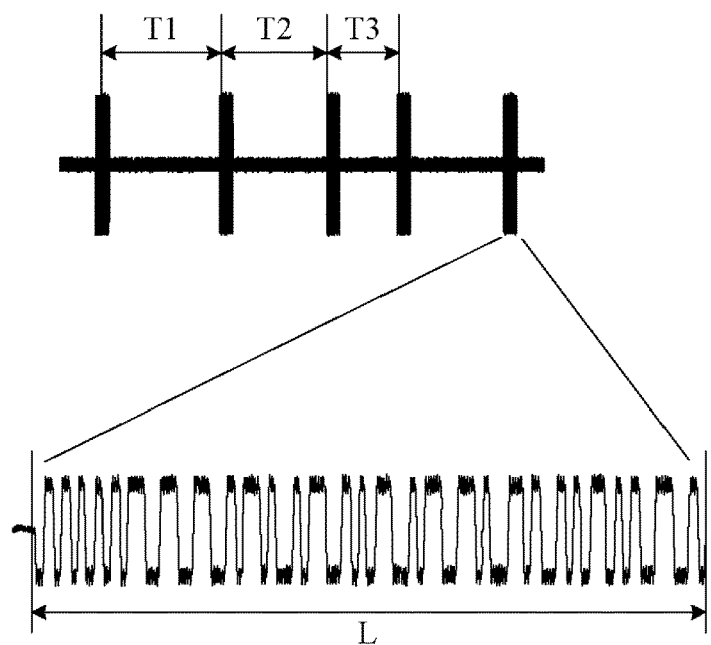
FIG. 6 is an explanatory diagram showing data signal of pulse train generated by a signal generator illustrated in FIG. 5.

FIG. 6 shows the area signal of pulse train generated by the first signal generator 84c1 to be passed through the boundary wire 72 that is corresponding to the binary data pulses sent from the charging ECU 84b. As shown, the area signal has a signal length L and is supplied to the boundary wire at random periods Tn. Although not shown, the second signal generator 84c2 generates similar signal.

Figure 4:
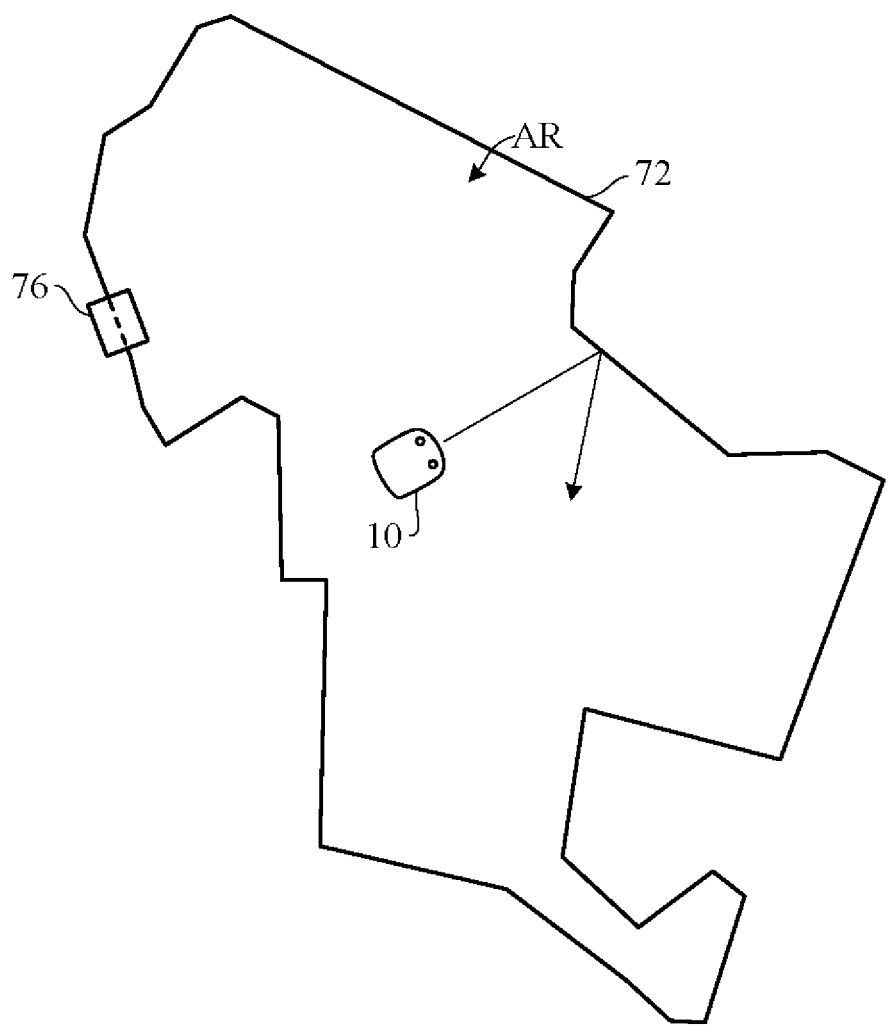
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
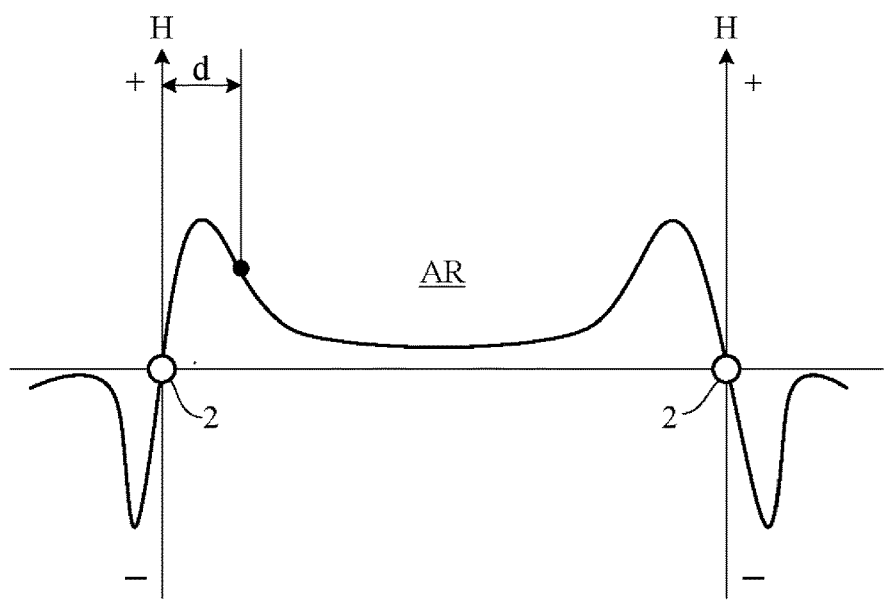
FIG. 7 is an explanatory diagram showing relationship between distance from the boundary wire and magnetic field strength generated by the data signal of FIG. 6.

FIG. 7 is a diagram showing relationship between distanced from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
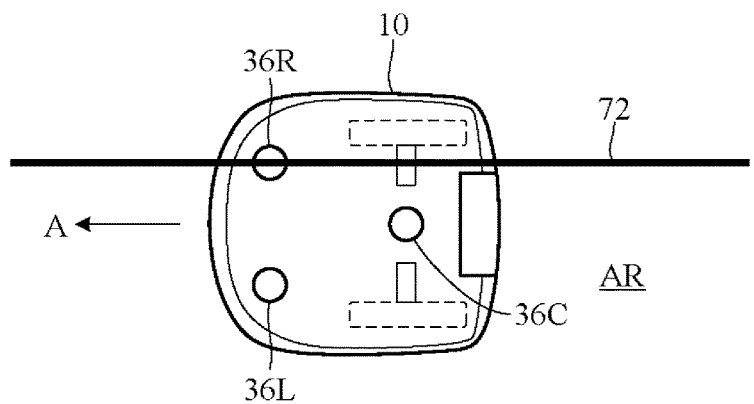
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Figure 9:
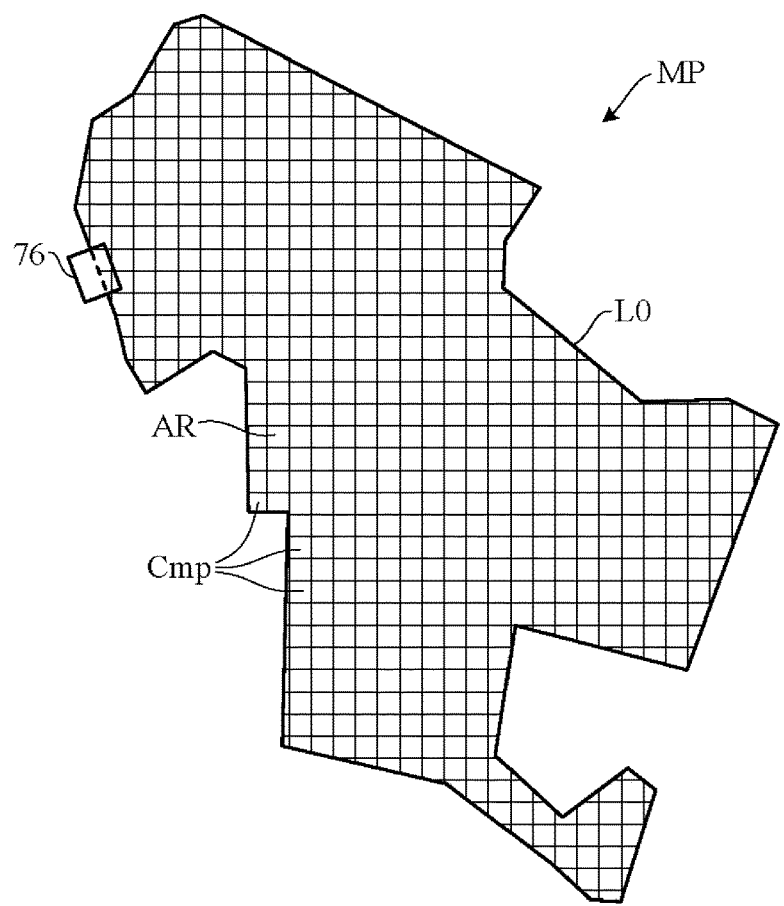
FIG. 9 is an explanatory diagram showing an example of a map of the working area illustrated in FIG. 4.

FIG. 9 is a diagram showing an example of the working area map MP. In the map MP, position of the boundary wire 72 is depicted as the boundary line (L0). More specifically, the map MP is configured by arraying the square cells Cmp in a grid pattern within a rectangular coordinate system plane including an X axis and a Y axis (XY plane) corresponding to inside of the working area AR. The plane is set with a reference orientation with respect to an origin corresponding to the position of the charging station 76. Each cell Cmp includes position data of X, Y coordinate. Size of the cells Cmp can be varied as appropriate and can, for example, be defined to coincide with working width of maximum outer diameter of blade 20.

Although the ECU 44 controls running operation of the vehicle 10 based on the illustrated map MP, the characterizing feature of the control apparatus for a utility vehicle according to this embodiment is the turning control of the vehicle 10 in the vicinity of the boundary wire 72, so the following explanation is focused on this point.

Figure 10:
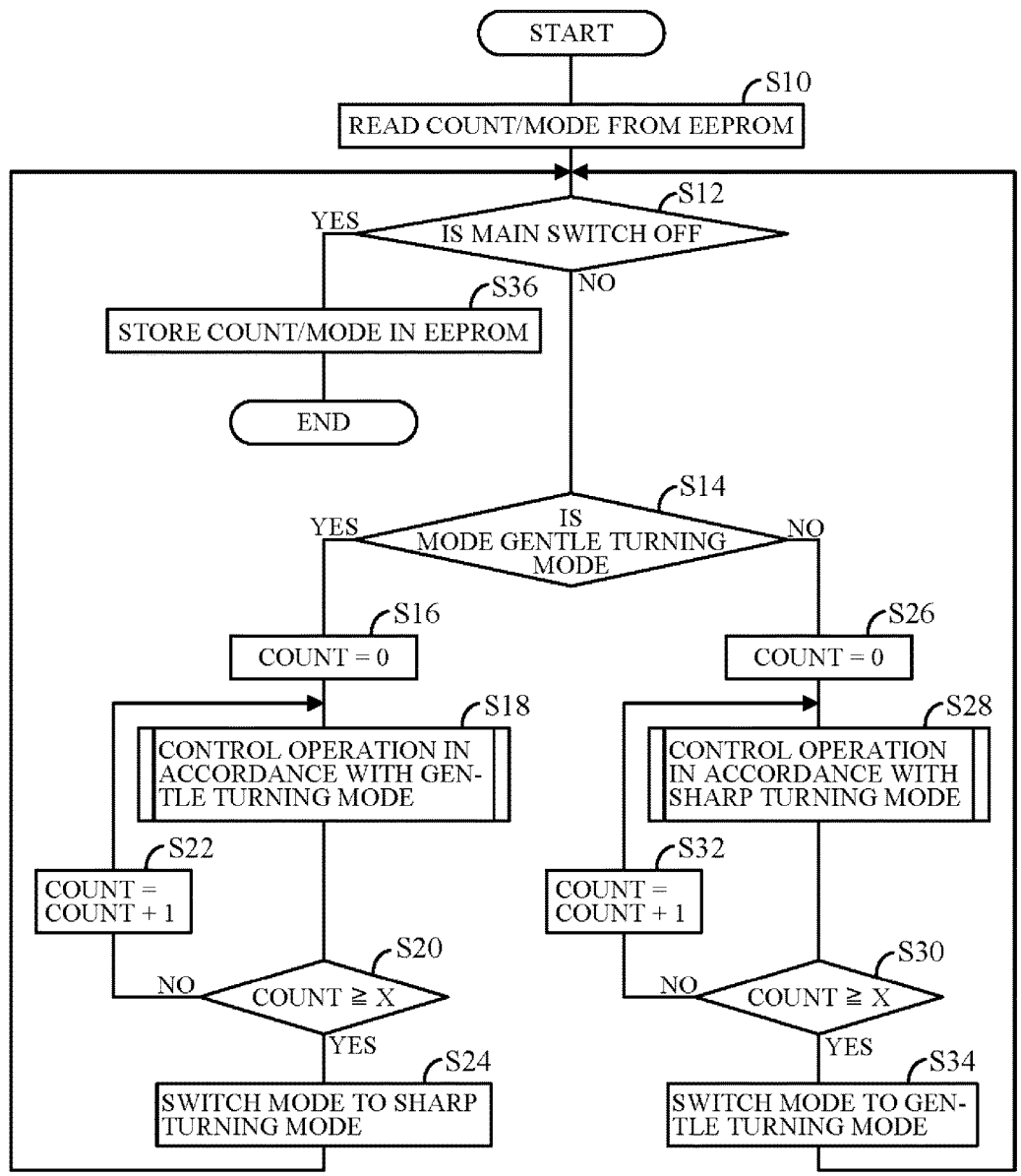
FIG. 10 is a flowchart showing operation of the control apparatus shown in FIG. 1.

FIG. 10 is a flowchart showing operations of the control apparatus for a utility vehicle. The program shown is executed by the CPU 44a of the ECU 44. More exactly, as indicated in FIG. 3, the ECU 44 has the CPU (microprocessor) 44a and the memory (44c) in which the CPU (microprocessor) 44a is configured to function as a running (operation) control unit (or control means) 44a1, and the processing shown in FIG. 10 is executed by the running control unit 44a1.

Now to explain, when execution of the shown program is commenced by the operator turning ON the main switch 64, first, in S10, MODE and COUNT (explained later) are read from the EEPROM of the memory 44c.

Next, in S12, it is determined whether the main switch 64 is OFF, and when the result is NO, the program goes to S14, in which it is determined whether MODE is gentle turning mode.

Figure 11:
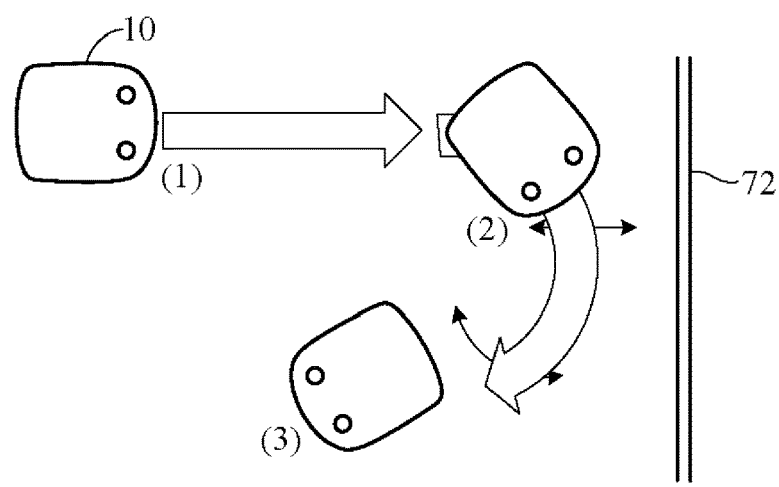
FIG. 11 is an explanatory diagram explaining gentle turning mode in the operation illustrated in FIG. 10.
Figure 12:
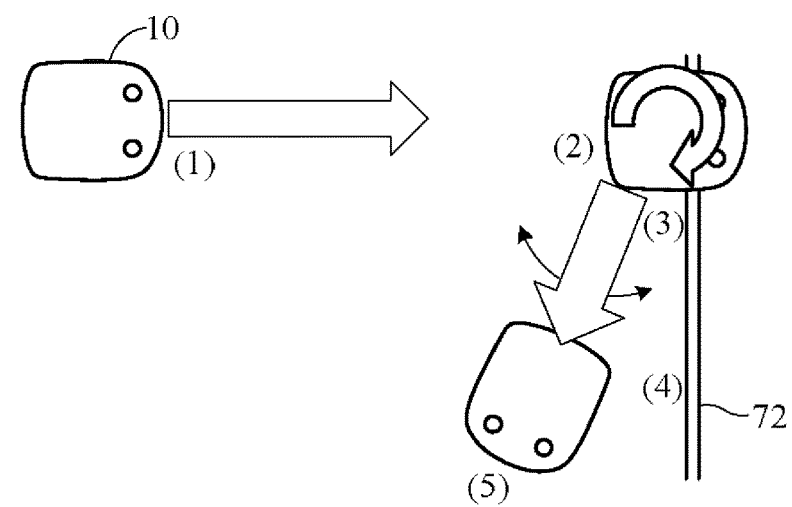
FIG. 12 is an explanatory diagram explaining sharp turning mode in the operation illustrated in FIG. 10.

Here explaining the processing of FIG. 10 with reference to FIGS. 11 and 12, in this embodiment two modes of turning the vehicle 10 are available when it approaches the boundary wire 72, namely a gentle turning mode in which the vehicle 10 is turned while running in the vicinity of the boundary wire 72 (gentle angle turning; first turning mode) and a sharp turning mode in which the vehicle 10 is once paused near the boundary wire 72 and then turned (turning at a sharp angle; second turning mode).

During running of the vehicle 10, the mode is switched or selected alternatively each time predetermined conditions are satisfied, and operation of drive motors 22 is controlled to turn the vehicle 10 in accordance with the switched turning mode.

FIGS. 11 and 12 are explanatory diagrams explaining the gentle turning mode and the sharp turning mode, respectively.

Now for an explanation of the gentle turning mode with reference to FIG. 11: In this mode, the vehicle 10 is controlled to run straight ahead (1), turn at a gentle angle without stopping when the magnetic field strength of the boundary wire 72 exceeds a certain value (2), and run straight forward (3).

Figure 13:
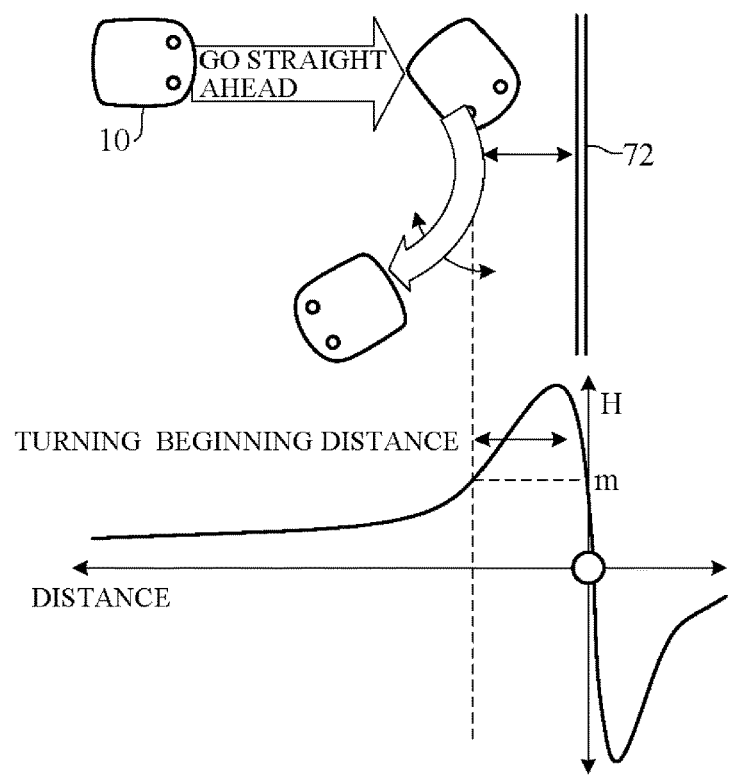
FIG. 13 is an explanatory diagram explaining the gentle turning mode of FIG. 11 more specifically.

More specifically, as shown in FIG. 13, when the magnetic field strength H of the boundary wire 72 detected by one or the other of the left (first) and right (second) magnetic sensors 36L and 36R installed on the left and right sides in the vehicle width direction exceeds a threshold value m, a turning radius and turning angle of the vehicle 10 are calculated, and the vehicle 10 is turned in accordance with the calculated turning radius and turning angle toward the side of the left or right magnetic sensor 36L or 36R whose output indicates lower magnetic field strength.

Figure 14:
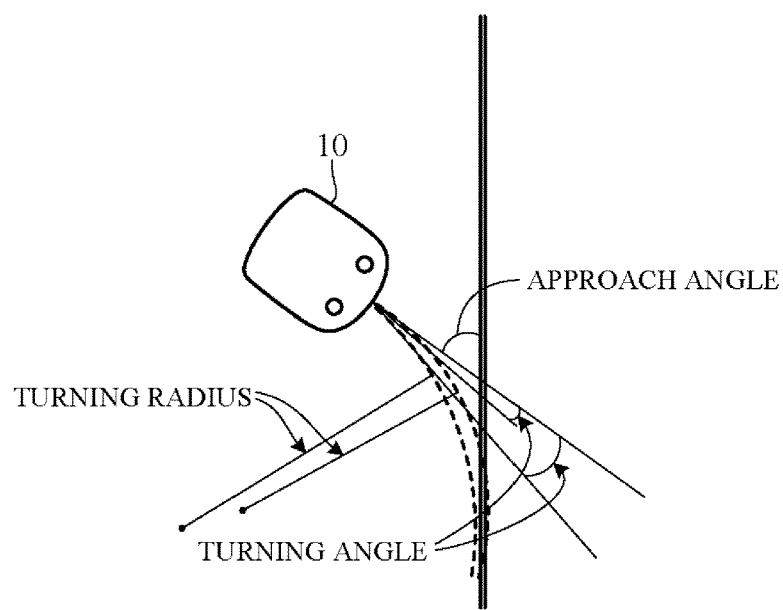
FIG. 14 is an explanatory diagram similarly explaining the gentle turning mode of FIG. 11 more specifically.

Turning radius and turning angle are illustrated in FIG. 14. Since the position of the vehicle 10 is detected in the working area map MP as stated earlier, approach angle of the vehicle 10 toward the boundary wire 72 is calculated using this map, and the turning angle is calculated to a random value (is arbitrarily defined) between a minimum value and a maximum value (near 180°) from the calculated approach angle and the associated turning radius is calculated to a random value (is arbitrarily defined) between the minimum value and maximum value (near infinity).

Since the left and right rear wheels 16 of the utility vehicle 10 can independently be driven forward and rearward, it is possible, as pointed out earlier, to do a so-called "pivot-turn" by rotating one of the rear wheels 16 forward and the other rearward at the same speed to make the vehicle 10 do an about turn (180° turn about) in place.

As shown in FIG. 12, sharp turning mode is a mode in which the vehicle 10 is controlled to run straight forward (1), once stop when a front end part of the body 12 corresponding to at least one of the first and second magnetic sensors 36L and 36R crosses over the boundary wire 72 (2), next turn with the front end part of the body 12 that crossed over the boundary wire 72 as the outer wheel side, then stop (4), and thereafter run straight forward (5).

In this embodiment, predetermined conditions include operating time of the vehicle 10. Specifically, it is determined that predetermined conditions are satisfied when the operating time of the vehicle 10 is equal to or greater than a prescribed time and when it is determined that the predetermined operating conditions are satisfied, turning mode is selected (switched). The prescribed time defined, for example, as 15 minutes for gentle turning mode and 10 minutes for sharp turning mode.

Further, the predetermined conditions include the number of turns by the vehicle 10. Specifically it is determined that the predetermined conditions are satisfied when the number of turns by the vehicle 10 is equal to or greater than a prescribed number and when it is determined that the predetermined operating conditions are satisfied, turning mode is switched (selected). In the case of number of turns, the prescribed number is defined, for example, as 15 times for gentle turning mode and 10 times for sharp turning mode.

MODE and COUNT read in S10 of the flowchart of FIG. 10 respectively mean selected turning mode and cumulative total of operating time or number of turns, i.e., the number of times that the predetermined conditions are satisfied.

Now returning to the explanation of the flowchart of FIG. 10 with the foregoing background in mind, when the result in S14 is YES, i.e., when MODE selected in the preceding cycle is determined to be gentle turning mode, the program goes to S16, in which COUNT is reset to zero, and to S18, in which control is performed in accordance with gentle turning mode. This aspect is taken up in further detail later.

Next, in S20, it is determined whether COUNT is equal to or greater than X (aforesaid prescribed number of turns or prescribed time). The first result in S20 is of course NO and the program goes to S22, in which COUNT is incremented by 1, and then returns to S18. On the other hand, when the result in S20 is YES, the program goes to S24, in which MODE is switched to sharp turning mode (sharp turning mode is selected).

When the result in S14 is NO, i.e., when MODE selected in the preceding cycle is determined to be sharp turning mode, the program goes to S26, in which COUNT is reset to zero, and to S28, in which control is performed in accordance with sharp turning mode. This aspect is also taken up in further detail later below.

Next, in S30, it is determined whether COUNT is equal to or greater than X, and when the result is NO, the program goes to S32, in which COUNT is incremented by 1, and then returns to S28, and when YES, goes to S34, in which MODE is switched to gentle turning mode (gentle turning mode is selected).

Figure 15:
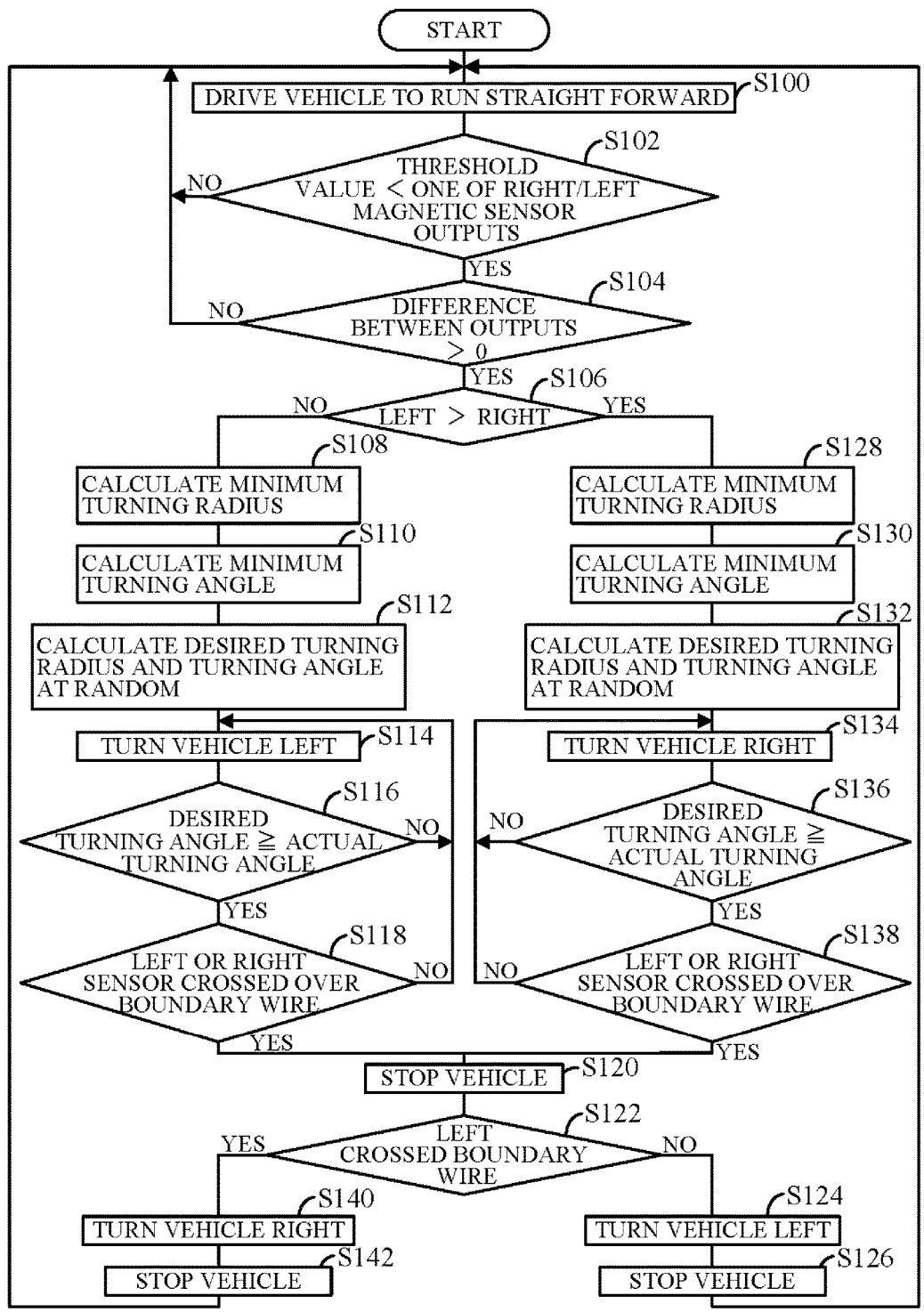
FIG. 15 is a subroutine flowchart of the gentle turning mode of FIG. 10.

FIG. 15 is a subroutine flowchart of the gentle turning mode of S18 in the flowchart of FIG. 10.

Now to explain, in S100 the vehicle 10 is driven to run straight forward, whereafter the program goes to S102, in which it is determined whether a left or right sensor output, i.e., magnetic field strength of the boundary wire detected by one or the other of the left (first) and right (second) magnetic sensors 36L and 36R, exceeds the threshold value m in FIG. 13.

When the result in S102 is NO, the program returns to S100, and when YES, goes to S104, in which it is determined whether difference value between the outputs of the left and right) magnetic sensors 36L and 36R is equal to or greater than zero, i.e., whether the body 12 is advancing at an approach angle of less than 90° relative to the boundary wire 72 (i.e., obliquely approaching the boundary wire 72).

When the result in S104 is NO, the program returns to S100, and when YES, goes to S106, in which it is determined which of the outputs of the left and right magnetic sensors 36L and 36R is greater, namely, whether the vehicle 10 is approaching the boundary wire 72 diagonally from the right (and should turn left) or diagonally from the left (and should turn right).

When the vehicle 10 is determined to be approaching diagonally from the right (and should turn left), the program goes to S108, in which the aforesaid minimum value of the turning radius is calculated, and then to S110, in which the aforesaid minimum value of the turning angle is calculated.

Next, in S112, a desired turning radius and a desired turning angle falling between the minimum values and maximum values of the calculated turning radius and turning angle are randomly calculated from random functions or the like, whereafter the program goes to S114, in which the vehicle 10 is turned left at the calculated desired turning radius and turning angle.

In other words, when turning in the vicinity of the boundary wire 72 in gentle turning mode, the (desired) turning radius and (desired) turning angle are calculated, and the vehicle 10 is then turned based on the calculated turning radius and turning angle toward the side of the left or right magnetic sensors 36L or 36R whose output indicates lower magnetic field strength.

The reason for randomly defining turning range and angle of the vehicle 10 in the processing of S108 to S114 is to avoid running route overlap so as to prevent unmown patches from being left during mowing.

Next, in S116, it is determined whether the actual turning angle is smaller than the desired turning angle calculated in S112, and when the result is NO, the program returns to S114, and when the result in S116 is YES, the program goes to S118, in which it is determined whether the left or right magnetic sensor 36L or 36R, specifically the front right edge of the body 12 where the right sensor 36R is located, crossed over the boundary wire 72 and the right edge of the vehicle 10 went outside the working area AR.

When the result in S118 is NO, the program returns to S114, and gentle turning is achieved by repeating the aforesaid processing.

On the other hand, when the result in S118 is YES, the program goes to S120, in which the vehicle 10 is once stopped. In other words, since the situation can be taken to mean that turning could not be completed, the program goes to S122, in which it is determined whether the front left edge of the vehicle 10 went outside the working area AR based on the outputs of the left and right magnetic sensors 36L and 36R. In this case, as the right edge was determined to be outside the working area AR in S118, the result of the determination in S122 is NO, and the program goes to S124, in which the utility vehicle 10 is controlled to turn leftward. Next, in S126, the vehicle 10 is once stopped.

Further, when it is determined in S106 that the vehicle 10 is approaching the boundary wire 72 diagonally from the left (and should turn right), the program goes to S128, in which the aforesaid minimum value of the turning radius is calculated. The program then proceeds from S130 to S138, and so long as the result in S138 remains NO, performs processing similar to that from S108 to S118, thereby achieving right turning by gentle turning.

On the other hand, when the result in S138 is YES, which can be taken to mean that turning could not be completed, the program goes to S120, in which the vehicle 10 is once stopped. Next, in S122, whether the front left edge of the vehicle 10 is outside the working area AR is determined based on the outputs of the left and right magnetic sensors 36L and 36R.

In this case, the result in S118 is YES and the left edge is determined to be outside the working area AR, so that the result in S122 is YES and the program goes to S140, in which running is controlled so that the vehicle 10 turns right. Next, in S142, the utility vehicle 10 is once stopped.

Figure 16:
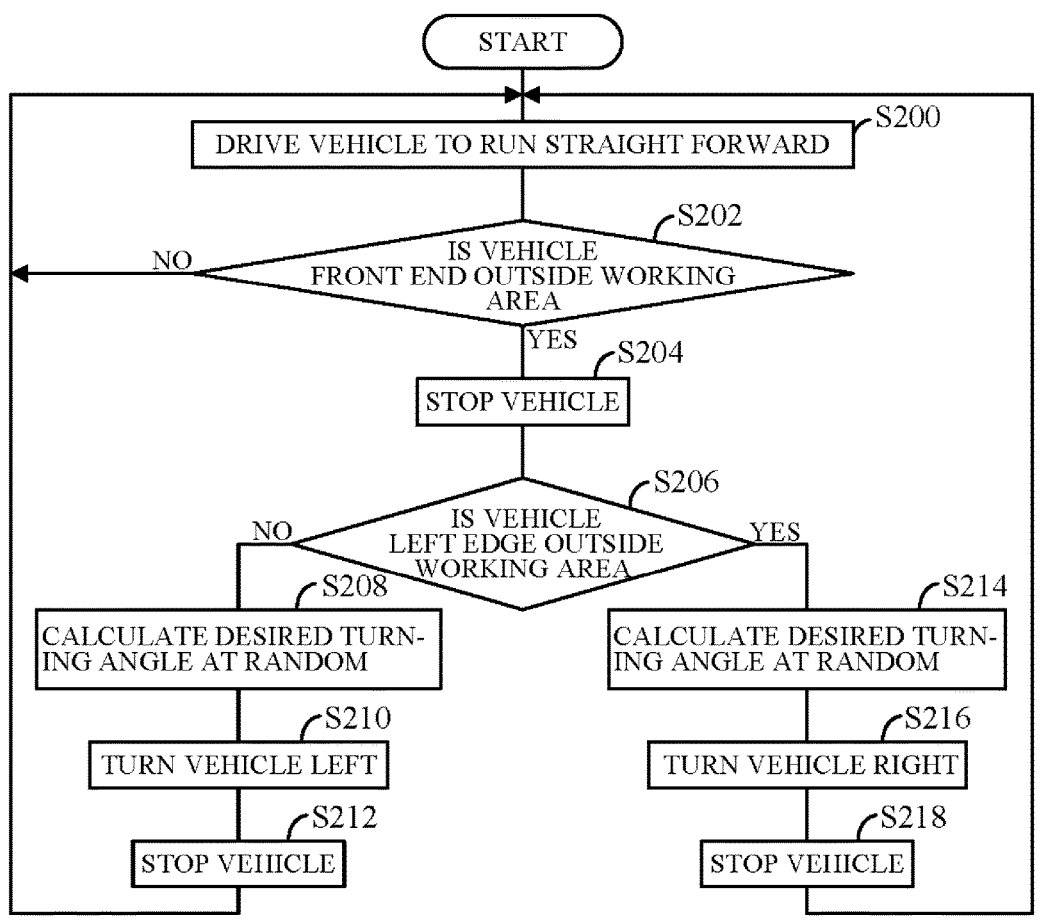
FIG. 16 is a subroutine flowchart of the sharp turning mode of FIG. 10.

FIG. 16 is a subroutine flowchart of the sharp turning mode of S28.

Now to explain, in S200 the vehicle 10 is driven to run straight forward and the program goes to S202, in which it is determined from the outputs of the left and right magnetic sensors 36L and 36R whether the vehicle 10, more specifically the front of the vehicle 10 (its body 12), is outside the working area.

When the result in S202 is NO, the program returns to S200, and when YES, goes to S204, in which the vehicle 10 is once stopped. Next, in S206, it is determined whether the left edge of the body 12 corresponding to the sensor installed region is outside the working area AR from the outputs of the left and right magnetic sensors 36L and 36R.

When the result in S206 is NO, the program goes to S208, in which, by processing similar to that of S108 to S114 of the FIG. 15 flowchart, a desired turn angle is randomly calculated in order to avoid occurrence of unmown patches, and then goes to S210, in which running is controlled so that the vehicle 10 turns left. Next, in S212, the vehicle 10 is once stopped.

On the other hand, when the result in s206 is YES, the program goes to S214, in which processing similar to that described regarding S206 is performed, and then to S216, in which running is controlled so that the vehicle 10 turns right. Next, in S218, the vehicle 10 is once stopped.

Returning to the explanation of the FIG. 10 flowchart, when, on the other hand, the result of the determination of S12 is NO, i.e., when the main switch 64 is determined to be turned OFF, the program goes to S36, in which the values of MODE and COUNT calculated up to that point are stored (entered) in the EEPROM of the memory 44c and the program is terminated. Thus a configuration is adopted in which the number of times that the predetermined conditions are satisfied is memorized in the EEPROM of the memory 44c after finishing controlling of the operation of the drive motors 26 (after stopping work).

As stated above, the present embodiment is configured to have an apparatus and method for controlling operation of a utility vehicle (10) that detects a magnetic field generated during flow of electric current from an electric power supply (signal generators 84c) through a boundary wire (72) laid around a working area (AR) and is driven by a prime mover (drive motor 26) to run within the working area based on the detected magnetic field, comprising: first and second magnetic sensors (36L, 36R) that are installed at lateral right and left positions symmetrical in a vehicle width direction of a body (12) of the utility vehicle (10) with respect to a vehicle center line (CL1) extending in a forward-rearward direction and produce outputs proportional to strength of the magnetic field during flow of electric current through the boundary wire (72); and an electronic control unit (44) having a microprocessor (CPU 44a) and a memory (44c), wherein the microprocessor is configured to function as: a running control unit (44a1, S10-S36, S100-S142, S200-S218) configured to switch turning mode between a first (gentle) turning mode to make the vehicle (10) turn while running near the boundary wire (72) and a second (sharp) turning mode to make the vehicle (10) pause near the boundary wire (72) and then turn, when it is determined from the outputs of the first and second magnetic sensors (36R, 36L) that the vehicle (10) approaches the boundary wire (72), each time predetermined conditions are satisfied, and controls operation of the prime mover (26) such that the vehicle (10) turns in accordance with the switched turning modes.

The above configuration enables establishment of first and second turning modes of turning at a gentle angle without pausing near the working area AR and of turning at a sharp angle and by switching turning mode between these modes each time predetermined conditions are satisfied. Thus, by alternating the turning mode successively, it become possible to prevent the problem of leaving an unserviced region in the vicinity of the working area AR, while also enhancing work efficiency.

In the apparatus and method, the predetermined conditions includes operating time of the vehicle (COUNT), and it is determined that predetermined conditions are satisfied when the operating time of the vehicle (10) is equal to or greater than a prescribed time (X, S20, S30). With this, it becomes possible to switch the turning mode appropriately.

In the apparatus and method, the predetermined conditions includes number of turn of the vehicle (COUNT), and it is determined that predetermined conditions are satisfied when the number of the turn of the vehicle is equal to or greater than a prescribed number (X, S20, S30). With this, it becomes possible to switch the turning mode appropriately.

In the apparatus and method, the running control unit memorizes a number of times (COUNT) that the predetermined conditions are satisfied after finishing controlling of the operation of the prime mover (S36). With this, in addition to the effects and advantages mentioned above, it becomes possible to switch the turning mode appropriately when resuming the operation.

In the apparatus and method, the first turning mode is a mode to calculate a turning radius and turning angle of the vehicle (10) and to turn the vehicle (10) in accordance with the calculated turning radius and turning angle toward a side of one of the first and second magnetic sensors (36L, 36R) whose output indicates lower magnetic field strength (S18, S100-S142). With this, it becomes possible to more effectively prevent the problem of leaving an unserviced region in the vicinity of the working area AR.

In the apparatus and method, approach angle of the vehicle (10) toward the boundary wire (72) is calculated, and the turning radius and turning angle are respectively calculated to random values between minimum values and maximum values from calculated approach angle (S18, S100-S142). With this, it becomes possible to still more effectively prevent the problem of leaving an unserviced region in the vicinity of the working area AR.

In the apparatus and method, the second turning angle is a mode to make the vehicle (10) run straight forward, once stop the vehicle (10) when a front end part of the body (12) of the vehicle (10) corresponding to at least one of the first and second magnetic sensors (36L, 36R) crosses over the boundary wire (72), next turn the vehicle (10) with the front end of the body (12) that crossed over the boundary wire (72) as an outer wheel side (S28, S200-S218). With this, it becomes possible to more effectively prevent the problem of leaving an unserviced region in the vicinity of the working area AR.

In the above, it should be noted that values of COUNT and X are examples and should not be limited thereto.

It should further be noted that although the utility vehicle is applied for a lawn mowing or grass mowing, it may applied to any other type of works.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of a utility vehicle that detects a boundary of a working area and is driven by a prime mover to run within the working area based on the detected boundary, comprising:
   a sensor installed on the utility vehicle and produces outputs indicating the boundary of the working area; and
   an electronic control unit having a microprocessor and a memory,
   wherein the microprocessor is configured to function as:
   a running control unit configured to control operation of the prime mover such that the vehicle turns in accordance with a first turning mode to make the vehicle turn while running near the boundary at a desired turning radius and a first desired turning angle and a second turning mode to make the vehicle pause near the boundary and then turn at a second desired turning angle when it is determined from the outputs of the sensor that the vehicle approaches the boundary;
   a mode setting unit configured to initially set one of the first turning mode and the second turning mode at beginning of operation; and
   a mode switching unit configured to switch the turning mode between the first turning mode and the second turning mode each time it is determined that a predetermined condition including at least one of an operating time of and a number of turns of the vehicle is satisfied,
   wherein the running control unit controls operation of the prime mover such that the vehicle turns in accordance with the switched turning mode.

2. The apparatus according to claim 1, wherein the predetermined condition includes the operating time of the vehicle, and it is determined that the predetermined condition is satisfied when the operating time of the vehicle is equal to or greater than a prescribed time.

3. The apparatus according to claim 1, wherein the predetermined condition includes the number of turns of the vehicle, and it is determined that the predetermined condition is satisfied when the number of the turns of the vehicle is equal to or greater than a prescribed number.

4. The apparatus according to claim 1, wherein the running control unit memorizes a number of times that the predetermined condition is satisfied after finishing controlling of the operation of the prime mover.

5. The apparatus according to claim 1, wherein the first turning mode is a mode to calculate the desired turning radius and the first desired turning angle of the vehicle and to turn the vehicle in accordance with the calculated turning radius and turning angle toward a side of a body of the vehicle.

6. The apparatus according to claim 5, wherein an approach angle of the vehicle toward the boundary is calculated, and the first desired turning angle is calculated based on random values between a minimum value and a maximum value of a calculated approach angle.

7. The apparatus according to claim 1, wherein the second turning mode is a mode to make the vehicle run straight forward, pause the vehicle when a front end part of a body of the vehicle crosses over the boundary, and next turn the vehicle with the front end part of the body that crossed over the boundary as an outer wheel side.

8. A method for controlling operation of a utility vehicle that detects a boundary of a working area and is driven by a prime mover to run within the working area based on the detected boundary, having:
  a sensor installed on the utility vehicle and produces outputs indicating the boundary of the working area; comprising the steps of:
  controlling operation of the prime mover such that the vehicle turns in accordance with a first turning mode to make the vehicle turn while running near the boundary at a desired turning radius and a first desired turning angle and a second turning mode to make the vehicle pause near the boundary and then turn at a second desired turning angle when it is determined from the outputs of the sensor that the vehicle approaches the boundary;
  initially setting one of the first turning mode and the second turning mode at beginning of operation; and
  switching the turning mode between the first turning mode and the second turning mode each time it is determined that a predetermined condition including at least one of an operating time of and a number of turns of the vehicle is satisfied,
  wherein the step of controlling operation of the prime mover controls operation of the prime mover such that the vehicle turns in accordance with the switched turning mode.

9. The method according to claim 8, wherein the predetermined condition includes the operating time of the vehicle, and it is determined that the predetermined condition is satisfied when the operating time of the vehicle is equal to or greater than a prescribed time.

10. The method according to claim 8, wherein the predetermined condition includes a number of turns of the vehicle, and it is determined that the predetermined condition is satisfied when the number of the turns of the vehicle is equal to or greater than a prescribed number.

11. The method according to claim 8, wherein the step of controlling operation of the prime mover memorizes a number of times that the predetermined condition is satisfied after finishing controlling of the operation of the prime mover.

12. The method according to claim 8, wherein the first turning mode is a mode to calculate the desired turning radius and the first desired turning angle of the vehicle and to turn the vehicle in accordance with the calculated turning radius and turning angle toward a side of a body of the vehicle.

13. The method according to claim 12, wherein an approach angle of the vehicle toward the boundary is calculated, and the first desired turning angle is calculated to random values between a minimum value and a maximum value of a calculated approach angle.

14. The method according to claim 8, wherein the second turning mode is a mode to make the vehicle run straight forward, pause the vehicle when a front end part of a body of the vehicle crosses over the boundary, and next turn the vehicle with the front end part of the body that crossed over the boundary as an outer wheel side.

* * * * *